March 28, 1961 A. BERNING ET AL 2,977,060

FILM SPOOL

Filed June 19, 1957

INVENTORS
Alfred Berning and
Emil Schuster

By Michael S. Striker
agt.

United States Patent Office 2,977,060
Patented Mar. 28, 1961

2,977,060

FILM SPOOL

Alfred Berning, Schwelm, and Emil Schuster, Ludenscheid, Germany, assignors to Gustav Rafflenbeul, Schwelm, Westphalia, Germany Filed June 19, 1957, Ser. No. 666,712

2 Claims. (Cl. 242—71.8)

The invention relates to film spools made from synthetic material, especially thermoplastic synthetic material by injection molding, with a spool body having a slot-shaped aperture for introducing the end of a film, and side flanges coordinated to it. When producing plastic film spools of the type in question by injection molding, defects frequently occur in the quality of the spool which are primarily due to the fact that only a single gate is provided which is so located on the body that streams of injected plastic material have to travel distances which are very long and also of different lengths, so that they are cooled to a great extent when they meet, which leads to the formation of fins or welds which detrimentally affect the quality of the spool.

The object of the invention is, on the one hand, to avoid the above-mentioned objections during the production of the injection-molded film spool by simple and cheap means and, on the other hand, to provide the film spools, nevertheless, with bearing means for fitting the film spools in a photographic camera.

According to the invention, in a film spool produced from synthetic material, especially thermoplastic synthetic material by injection molding, with a core or body having a slot for introducing the end of the film and two side flanges, two gating points are arranged opposite each other adjacent the film slot in recesses or depressions in the surface of the spool. These depressions are preferably arranged midway between the ends of the body. It is also advisable to arrange the depressions on opposite sides of the film introduction slot.

By constructing and shaping a film spool injection-molded from plastic material in this manner, the undesirable features present in the film spools heretofore known, especially the welds detrimentally affecting their quality, are avoided to a great extent, because in the production of the spool, the plastic synthetic material is fed at two gating points which are located opposite each other adjacent the film insertion slot in the spool core. The preferably symmetrical arrangement of the gating points presents the advantage that the stream of synthetic material has to cover the same distance to either of the two side flanges of the spool, which not only has a favorable effect on the time of production, but also on the quality of the film spool. This applies particularly when, according to another feature of the invention, the hollow spool core is made in one piece with the side flanges.

The advantages of using several gating points become particularly apparent when the spool has a tubular core or body and an insertion slot or passage for the film end extending across the hollow interior of the core which is made in one piece with the side flanges and has its hollow ends provided with cylindrical inserts or plug members, forming bearing points for fitting the spool in a photographic camera. The wall of the film spool is of substantially the same thickness throughout, so that the solidification of the plastic material takes place absolutely uniformly. It is also noted that the inserts are made separately and subsequently fitted in the hollow spool core.

Furthermore, as mentioned above, the two side flanges are made in one piece with the core, which possesses the advantage that on the one hand, the space between the two side flanges is always constant, which is not the case with the known film spools in which at least one of the two side flanges is made separately and must be connected to the spool core, and, on the other hand, the side flanges are always at the desired right angle to the peripheral surface of the core. Owing to the possibility of accurately keeping the said dimensions the great advantage is derived that damage to the very delicate emulsion side of the film during the winding and unwinding operation on the spool core is to a great extent eliminated.

It is advisable to make the inserts symmetrical in relation to a plane extending at right angles to their longitudinal central axis. At the same time, the two end faces of the insert can be provided with radial slots or notches intersecting with a central bore of circular cross-section. The slots and the bore serve, on the one hand, as bearing for the film spool in a photographic camera and for the engagement of the entrainment or winding means and, on the other hand, for preventing the insertions from turning in the core. To attain this latter object, projections are preferably provided on the outer side of the film introduction passage crossing the hollow interior of the core, which projections engage in the slots in the inserts. For fixing the inserts in the hollow core the conicity of the spool core, necessary for the removal from the die, is utilized. If, therefore, the cylindrical inserts are introduced into the slightly conical bore of the core, this is only possible by exerting external force, so that a tight fit exists between the insert and the core. The effect of this tight fit is further increased by the clamping effect caused by the use of an elastic material and by the shape of the slots the combined lengths of which are equal to the diameter of the insert.

It is also noted that the symmetrical construction of the inserts presents considerable advantage when assembling the film spool, because when introducing the inserts into the hollow core it is not necessary for them to be brought into any particular position.

A preferred embodiment of the invention is illustrated by way of example in the accompanying drawing, in which.

Figure 2:
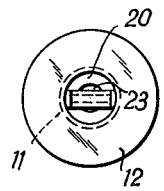
Fig. 2 is an end view of the film spool.
Figure 1:
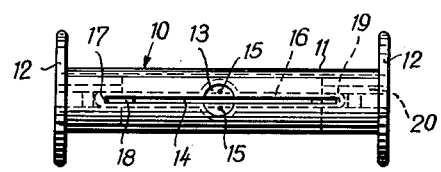
Fig. 1 is a side elevational view of a film spool according to the invention, with inserts indicated by dash lines.

Referring now to the drawings, a film spool 10, made from extruded synthetic material, such as polystyrol, has a tubular core 11 and side flanges 12 formed integral therewith. To facilitate the production of the spool and to eliminate former objections, a depression or recess 13 is provided in the spool wall and is located on both sides of one of a pair of slots 14 for introducing a film. Consequently, there are practically two depressions each of which has a recess 15 for a pouring point of the mold (not shown). By arranging the recesses in this manner the wall surface coming into contact with the delicate emulsion side of the film is, first of all, without any fins or welds. Furthermore, the symmetric arrangement of several recesses 15 advantageously affects the quality of the film spool because the streams of synthetic material produced during the die-casting must cover similar distances to the remote lying points, i.e. the side flanges, and because these streams reach the extreme ends of the film spool in a relatively short space of time. It is also noted that, in the construction of the film spool, importance is attached to keeping the wall of the core and the side flanges substantially of the same thickness, which has an advantageous effect on the quality or physical properties of the spool and on the speed at which it can be produced. For it is thus possible to maintain the solidifying time of the synthetic material practically of the same duration in all parts of the film spool.

Figures 3, 4:
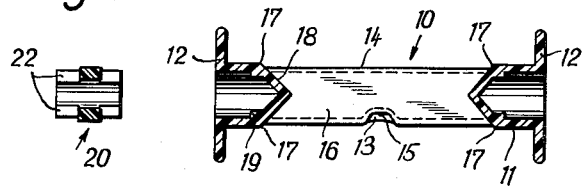
Fig. 3 is a longitudinal section through the film spool according to Fig. 1, but with the inserts removed.
Fig. 4 is a longitudinal section of an insert.
Figure 6:
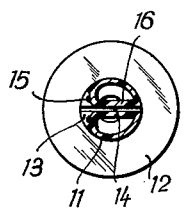
Fig. 6 is a section on line VI—VI of Fig. 5.

The slots 14 located on opposite sides of the tubular core 11 of the film spool are made of the same length so that it is immaterial from which side the end of the film—not shown in the drawing—is introduced. The longitudinal edges of the opposite slots 14 are connected by parallel wide walls 16 crossing the hollow spool, whereas ends 17 of the opposite slots are interconnected by bridge portions or webs 18 of V or roof shape. The point or apex of the roof-shaped webs is located in the spool axis. At this point the closed film introduction passage thus formed is of narrowest width. As can be seen from Fig. 3 of the drawing, the webs 18 have projections 19 formed thereon which extend in to the range of insert pieces 20 to be introduced and cooperate with slots therein to prevent the insert from turning.

Figure 5:
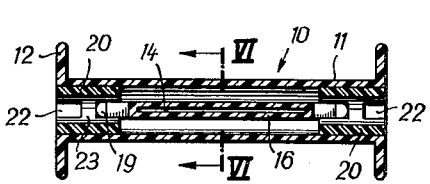
Fig. 5 is another longitudinal section through the film spool but with inserts fitted therein, and moreover displaced through an angle of 90° as compared with Fig. 3.
Figures 7, 8, 9:
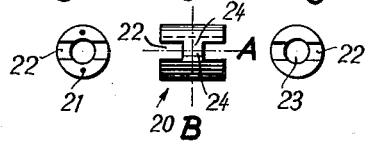
Fig. 7 shows an insert in side elevation.
Fig. 8 is an end view of the insert.
Fig. 9 shows the insert viewed from the opposite end to Fig. 8.

The insert or plug member 20 shown particularly in Figs. 4 and 7 to 9, is also made from plastic material by spraying or die-casting. Recesses 21 for the pouring points of the mold (not shown) are arranged diametrically opposite to each other on one end face of the insert 20 as shown in Fig. 8. The inserts 20, as can be seen from Fig. 7, are symmetrically shaped in relation to a plane B extending at right angles to their longitudinal central axis A. Radial slots 22 provided in the end faces of the insert 20 intersect with a central bore 23 of circular cross-section and extend over the entire width of the insert 20. As can be seen from Fig. 7, the depth of the slots is such that only a narrow web 24 remains on each of the diametrically opposite sides. The peripheral portions of the insert 20 adjacent the slots can thus yield resiliently when being introduced and, to assist this, they are preferably made from an elastic plastic material. The clamping effect caused thereby during the introduction of the inserts into the hollow spool core, in conjunction with the slight conicity of the inner wall of the core, is utilized for securing the inserts in a predetermined position which is illustrated in Fig. 5 of the drawing. At the same time the projections 19 formed on the spool core serve as a locking means to prevent turning of the insert. The projections 19 and the slot 22 are so dimensioned that, after the inserts have been introduced, the inserts lie flush with the side flanges, as shown in Fig. 5. It is found when assembling the film spool to be particularly advantageous that, when introducing the insert into the spool core, it is not necessary to see that this is in any particular position. The insert is in any case in the correct position irrespectively of which of its two ends is pushed first into the interior of the hollow core.

As has already been mentioned, the form of construction illustrated is only an example of how the invention can be put into practice and the invention is not restricted thereto. On the contrary, many other forms of construction and applications are possible. It is, of course, also possible to make the insert unsymmetrical, but this is open to the objection that in assembling, it must be observed that the insert is in the correct position when introducing it into the spool core. Therefore, the symmetrical construction of the insert is generally preferable.

We claim:

1. An all plastic injection moulded film spool comprising, a spool body having a tubular shell portion of substantially uniform wall thickness formed with an end socket at each end and with a pair of longitudinal slots provided in the wall of such shell portion opposite to each other, a pair of substantially parallel guide wall portions disposed within said shell portion integral therewith to interconnect the longitudinal edges of one slot with the respective longitudinal edges of the opposite slot; a pair of terminal flanges integral with respective ends of said tubular shell portion; and at least one plug member inserted into one of said end sockets of said shell portion and having a first transversely notched end portion adapted for engagement with a drive member for rotating the spool, said plug member having a second transversely notched end portion opposite said first end portion, and said one of said end sockets being formed with engagement means for engaging said second notched end portion for securing said plug member against rotation in said one of said end sockets.

2. An all plastic injection moulded film spool comprising, a spool body having a tubular shell portion of substantially uniform wall thickness with a pair of longitudinal slots provided in the wall of such shell portion opposite to each other, said tubular shell portion having a pair of recesses in the outer cylindrical face thereof arranged substantially midway between the ends thereof on opposite sides of one of said slots, a pair of substantially parallel guide wall portions disposed within said shell portion integral therewith to interconnect the longitudinal edges of one slot with the respective longitudinal edges of the opposite slot, a pair of bridge portions within such shell portion, each bridge portion interconnecting the respective ends of said slots integral with said guide wall portions as well as with the wall of said tubular shell portion, said bridge portions being spaced from the respective ends of said tubular shell portion a predetermined distance so that a substantially cylindrical end socket is formed by each end of said tubular shell portion; a pair of terminal flanges integral with the respective ends of said tubular shell portion; and at least one plug member inserted into one of said end sockets and having a first transversely notched end portion adapted for engagement with a drive member for rotating the spool, said plug member having a second transversely notched end portion opposite said first end portion, and said one of said end sockets being formed with engagement means for engaging said second notched end portion for securing said plug member against rotation in said one of said end sockets.

References Cited in the file of this patent

UNITED STATES PATENTS

| 651,625 | Hendrick | June 12, 1900 |
| 2,341,333 | Purinton | Feb. 8, 1944 |
| 2,400,024 | Roehrl | May 7, 1946 |
| 2,429,355 | Goldschmidt | Oct. 21, 1947 |

FOREIGN PATENTS

| 13,674 | Great Britain | June 16, 1904 |